(12) United States Patent
Kim

(10) Patent No.: US 12,272,827 B2
(45) Date of Patent: Apr. 8, 2025

(54) CATALYST FOR FUEL CELL, METHOD FOR MANUFACTURING SAME, AND MEMBRANE-ELECTRODE ASSEMBLY COMPRISING SAME

(71) Applicant: KOLON INDUSTRIES, INC., Seoul (KR)

(72) Inventor: Jung Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 599 days.

(21) Appl. No.: 17/625,806

(22) PCT Filed: Dec. 23, 2020

(86) PCT No.: PCT/KR2020/018964
§ 371 (c)(1),
(2) Date: Jan. 10, 2022

(87) PCT Pub. No.: WO2021/137514
PCT Pub. Date: Jul. 8, 2021

(65) Prior Publication Data
US 2022/0263099 A1    Aug. 18, 2022

(30) Foreign Application Priority Data
Dec. 31, 2019   (KR) .......................... 10-2019-0178837

(51) Int. Cl.
*H01M 4/92*      (2006.01)
*H01M 4/86*      (2006.01)
(Continued)

(52) U.S. Cl.
CPC ......... *H01M 4/921* (2013.01); *H01M 4/8657* (2013.01); *H01M 4/925* (2013.01);
(Continued)

(58) Field of Classification Search
None
See application file for complete search history.

(56) References Cited

U.S. PATENT DOCUMENTS 5,178,971 A * 1/1993 Itoh ...................... B01J 23/8926
502/326
2004/0265665 A1   12/2004 Yan

FOREIGN PATENT DOCUMENTS

CN        102064329 A     5/2011
CN        101395747 B    11/2011
(Continued)

OTHER PUBLICATIONS

J. Liang, N. Li, Z. Zhao, L. Ma, X. Wang, S. Li, X. Liu, T. Wang, Y. Du, G. Lu, J. Han, Y. Huang, D. Su, Q. Li, Angew. Chem. Int. Ed. 2019, 58, 15471. (Year: 2019) .*

(Continued)

*Primary Examiner* — Alix E Eggerding
(74) *Attorney, Agent, or Firm* — Harvest IP Law, LLP

(57) ABSTRACT

Disclosed are a catalyst for a fuel cell having excellent performance and durability, a method for manufacturing same, and a membrane-electrode assembly comprising same. The catalyst for a fuel cell of the present invention comprises: a support; and PtCo alloy particles supported on the support, wherein the PtCo alloy particles comprise a transition metal-doped or transition metal-partially alloyed surface that is modified with at least one transition metal selected from the group consisting of V, Cr, Mn, Fe, Ni, Cu, W, and Mo, or a transition metal-doped or transition metal-partially alloyed internal region including the transition metal.

16 Claims, 8 Drawing Sheets

(51) Int. Cl.
H01M 8/1018 (2016.01)
H01M 8/10 (2016.01)

(52) U.S. Cl.
CPC ......... H01M 4/926 (2013.01); H01M 8/1018 (2013.01); *H01M 2008/1095* (2013.01)

(56) References Cited

FOREIGN PATENT DOCUMENTS

| | | | |
|---|---|---|---|
| JP | 2011150867 | A | 8/2011 |
| JP | 5022335 | B2 | 9/2012 |
| JP | 2015032468 | A | 2/2015 |
| JP | 2016035869 | A | 3/2016 |
| JP | 2016148078 | A | 8/2016 |
| KR | 100759432 | B1 | 10/2007 |
| KR | 100823502 | B1 | 4/2008 |

OTHER PUBLICATIONS

Srivastava, R., Mani, P., Hahn, N. and Strasser, P. (2007), Efficient Oxygen Reduction Fuel Cell Electrocatalysis on Voltammetrically Dealloyed Pt—Cu—Co Nanoparticles †. Angewandte Chemie International Edition, 46: 8988-8991. (Year: 2007).*
The office action dated May 26, 2023 related to the corresponding Japanese Patent application.
"Efficient Oxygen Reduction Fuel Cell Electrocatalysis on Voltammetrically Dealloyed Pt—Cu—Co Nanoparticles", Angewandte Chemie, First published: Nov. 23, 2007.
The office action dated Aug. 16, 2023 related to the corresponding Chinese Patent application.
European search report, dated Nov. 18, 2024.
2. Choi Juhyuk et al.: "Au-doped PtCo/C catalyst preventing Co leaching for proton exchange membrane fuel cells", Applied Catalysis B. Environmental, vol. 247, Jun. 1, 2019 (Jun. 1, 2019), pp. 142-149, XP093009186, Amsterdam, NL, ISSN: 0926-3373, DOI: 10.1016/j.apcatb.2019.02.002.

* cited by examiner

CATALYST FOR FUEL CELL, METHOD FOR MANUFACTURING SAME, AND MEMBRANE-ELECTRODE ASSEMBLY COMPRISING SAME

CROSS REFERENCE TO RELATED APPLICATIONS

This application is a National Stage of International Application No. PCT/KR2020/018964 filed Dec. 23, 2020, claiming priority based on Korean Patent Application No. 10-2019-0178837 filed Dec. 31, 2019.

TECHNICAL FIELD

The present disclosure relates to a catalyst for fuel cells, a method of preparing the same, and a membrane-electrode assembly including the same. More particularly, the present disclosure relates to a catalyst for fuel cells having improved performance and durability, a method of preparing the same, and a membrane-electrode assembly including the same.

BACKGROUND ART

A polymer electrolyte membrane fuel cell (PEMFC), which generates electricity using a stacked structure of unit cells, each including a membrane-electrode assembly (MEA) and a separator (also referred to as a "bipolar plate"), is drawing attention as a next-generation energy source capable of replacing fossil fuels due to the high energy efficiency and environmental friendliness thereof.

The membrane-electrode assembly generally includes an anode (also referred to as a "fuel electrode"), a cathode (also referred to as an "air electrode"), and a polymer electrolyte membrane interposed therebetween.

When fuel such as hydrogen gas is supplied to an anode, the hydrogen at the anode is oxidized to produce a proton (W) and an electron (e). The produced proton is transferred to the cathode through the polymer electrolyte membrane, whereas the generated electron is transferred to the cathode through an external circuit. Oxygen supplied to the cathode is bonded to the proton and the electron, and thus is reduced to produce water.

Platinum or other precious metals having high catalytic activity and high corrosion resistance are used as a metal catalyst for forming an electrode in a membrane-electrode assembly (MEA).

In an effort to increase the active surface area of the catalyst, a catalyst formed by dispersing metal catalyst particles on the surface of an electrically conductive support (e.g., carbon, metal oxide or $C_3N_4$) has been developed.

In order to promote the commercialization of fuel cells, it is necessary to further improve the catalytic activity of the metal catalyst while reducing the amount of expensive platinum/precious metal that is used therefor. For this purpose, various types of alloys including precious metals such as platinum have been proposed. For example, PtCo alloys are known to have catalytic activity greater than platinum despite using a reduced amount of platinum. In addition, in order to further improve the PtCo alloy, research is actively underway on a ternary alloy, obtained by alloying Pt and Co with a third transition metal.

However, in recent years, decreased durability due to elution of Co at an active site during the fuel-cell reaction of a PtCo catalyst has been reported. For this reason, improved durability is required.

In addition, metal or alloy catalysts that can be prepared at relatively low cost and have satisfactory performance and durability have not yet been developed.

DISCLOSURE

Technical Problem

Therefore, the present disclosure relates to catalyst for a fuel cell that is capable of preventing problems caused by limitations and disadvantages of the related technology as described above, a method of preparing the same, and a membrane-electrode assembly including the same.

It is one object of the present disclosure to provide a catalyst for a fuel cell having excellent performance and durability.

It is another object of the present disclosure to provide a method of preparing a catalyst for a fuel cell having excellent performance and durability.

It is another object of the present disclosure to provide a membrane-electrode assembly having excellent performance and durability.

In addition to the aspects of the present disclosure described above, other features and advantages of the present disclosure will be described in the following detailed description, or will be more clearly understood by those skilled in the art to which the present disclosure pertains.

Technical Solution

In accordance with one aspect of the present disclosure, provided is a catalyst for a fuel cell including a support and a PtCo alloy particle supported on the support, wherein the PtCo alloy particle includes a transition metal-doped or transition metal-partially alloyed surface modified with at least one transition metal selected from the group consisting of V, Cr, Mn, Fe, Ni, Cu, W, and Mo, or a transition metal-doped or transition metal-partially alloyed internal region including the transition metal.

The PtCo alloy particle may further include a transition metal-free surface or a transition metal-free internal region, where the transition metal does not exist.

The PtCo alloy particle may include the transition metal-doped or transition metal-partially alloyed internal region and the transition metal-free internal region, and the transition metal-free internal region may be farther away from an exposed surface of the PtCo alloy particle than the transition metal-doped or transition metal-partially alloyed internal region.

In the PtCo alloy particle, the molar ratio of Co to Pt may be 0.05 to 0.4, and the molar ratio of the transition metal to Pt may be 0.03 to 0.15.

The transition metal may be Cu.

In another aspect of the present disclosure, provided is a method for preparing a catalyst for a fuel cell, the method including: preparing a first catalyst including a support and a PtCo alloy particle supported on the support; mixing the first catalyst with a precursor of at least one transition metal selected from the group consisting of V, Cr, Mn, Fe, Ni, Cu, W, and Mo to obtain a mixture; and heat-treating the mixture.

The molar ratio of Co to Pt in the PtCo alloy particle of the first catalyst may be 0.05 to 0.4.

The transition metal may be Cu, and the precursor may be $CuCl_2$, $CuSO_4$, $CuO$, $Cu(CO_2CH_3)_2$, $CuS$, $Cu(NO_3)_2$, $Cu(ClO_4)_2$, $CuCO_3$, or a mixture of two or more thereof.

The mixture may be obtained by (i) dispersing the first catalyst in a solution or dispersion containing the precursor, (ii) mixing the solution or dispersion containing the precursor with a dispersion containing the first catalyst, or (iii) directly mixing the precursor in a solid phase with the first catalyst in a solid phase.

The mixture may be obtained by (i) dispersing the first catalyst in a solution or dispersion containing the precursor, or (ii) mixing the solution or dispersion containing the precursor with a dispersion containing the first catalyst. In addition, the method for preparing the catalyst may further include drying the mixture before the heat-treating.

The heat-treating may be performed at 100 to 300° C. in an atmosphere of a reductive gas or in an atmosphere of a mixed gas including the reductive gas and an inactive gas for 10 to 60 minutes.

The heat-treating may be performed in an atmosphere of the reductive gas, and the reductive gas may be $NH_3$ gas.

The heat-treating may be performed in an atmosphere of the mixed gas, and the mixed gas may include 5 to 15 vol % of the reductive gas.

The heat-treating may be performed in an atmosphere of the mixed gas, and the mixed gas may include $H_2$ gas as the reductive gas and $N_2$ or Ar gas as the inactive gas.

The heat-treating may be performed in an atmosphere of the mixed gas, and the mixed gas may include $NH_3$ gas as the reductive gas and $N_2$ or Ar gas as the inactive gas.

In another aspect of the present disclosure, provided is a membrane-electrode assembly including an anode, a cathode, and a polymer electrolyte membrane interposed between the anode and the cathode, wherein at least one of the anode and cathode includes the catalyst described above.

The general description of the present disclosure as provided above is only for illustration or description of the present disclosure and does not limit the scope of the present disclosure.

Advantageous Effects

According to the present disclosure, both the performance and durability of the catalyst can be remarkably improved by doping and/or partially alloying the PtCo catalyst, specifically the PtCo alloy particle, with a transition metal. As a result, the membrane-electrode assembly manufactured using the catalyst of the present disclosure and the fuel cell including the same are capable of exhibiting excellent performance and durability.

DESCRIPTION OF DRAWINGS

The accompanying drawings, which are provided for better understanding of the present disclosure and constitute a part of the present specification, are given to exemplify the embodiments of the present disclosure and describe the principles and features of the present disclosure with reference to the following detailed description, in which.

Figure 2:
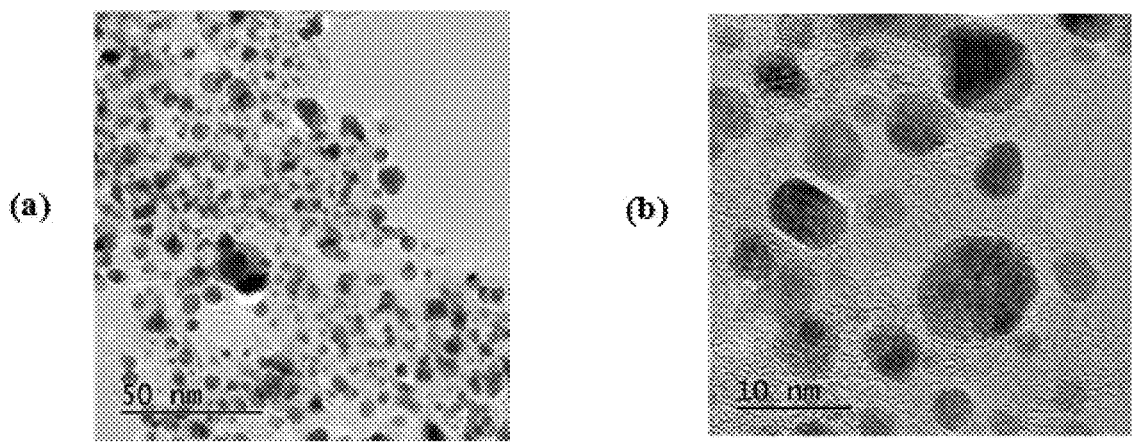
Figure 3:
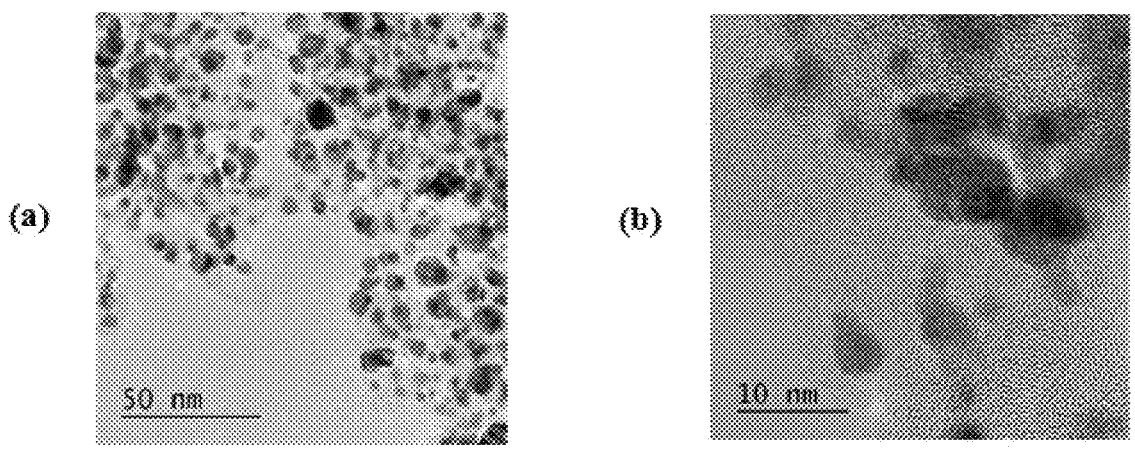
Figure 4:
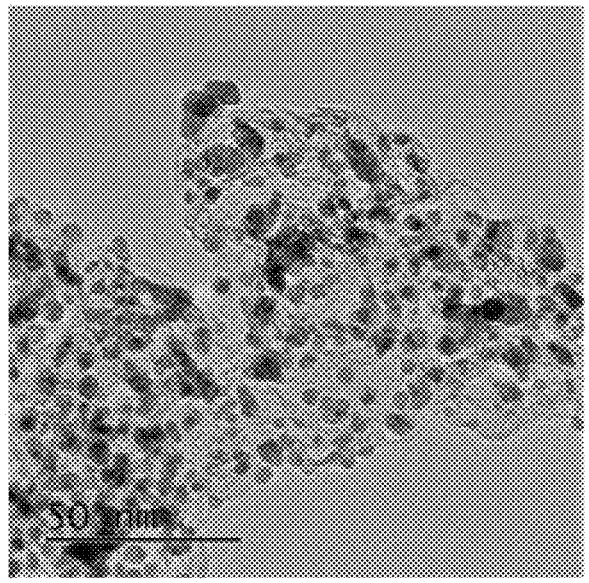
Figure 5:
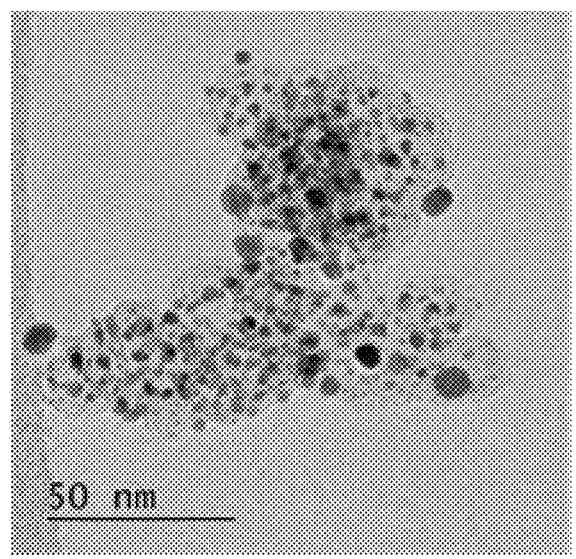
Figure 6:
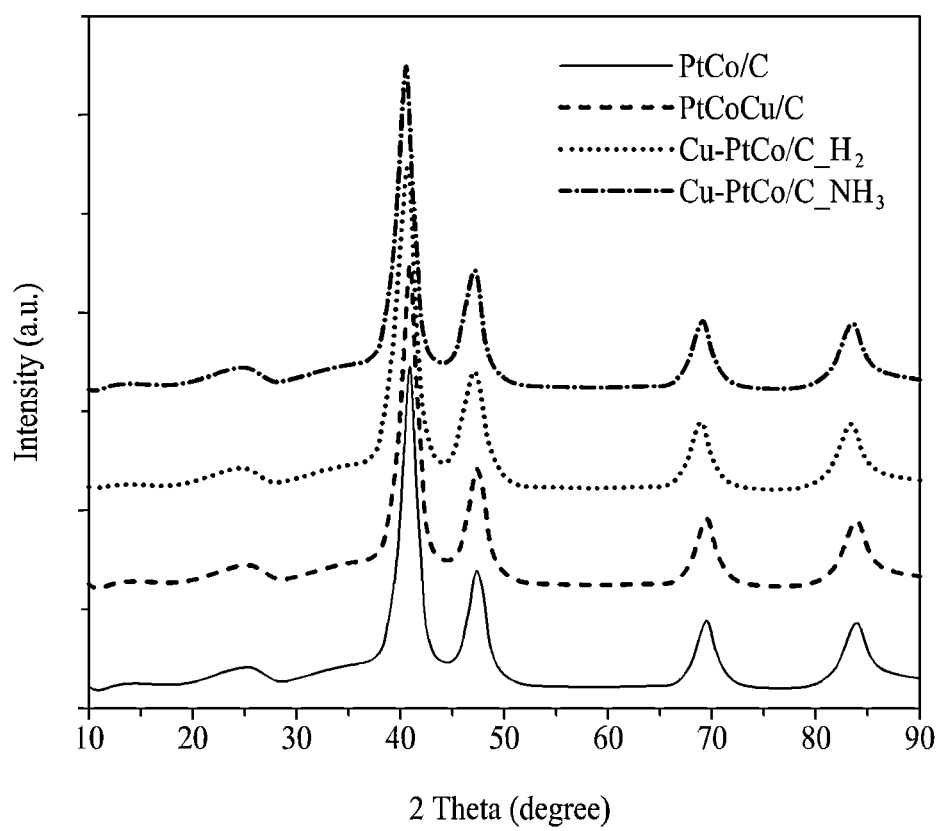
Figure 7:
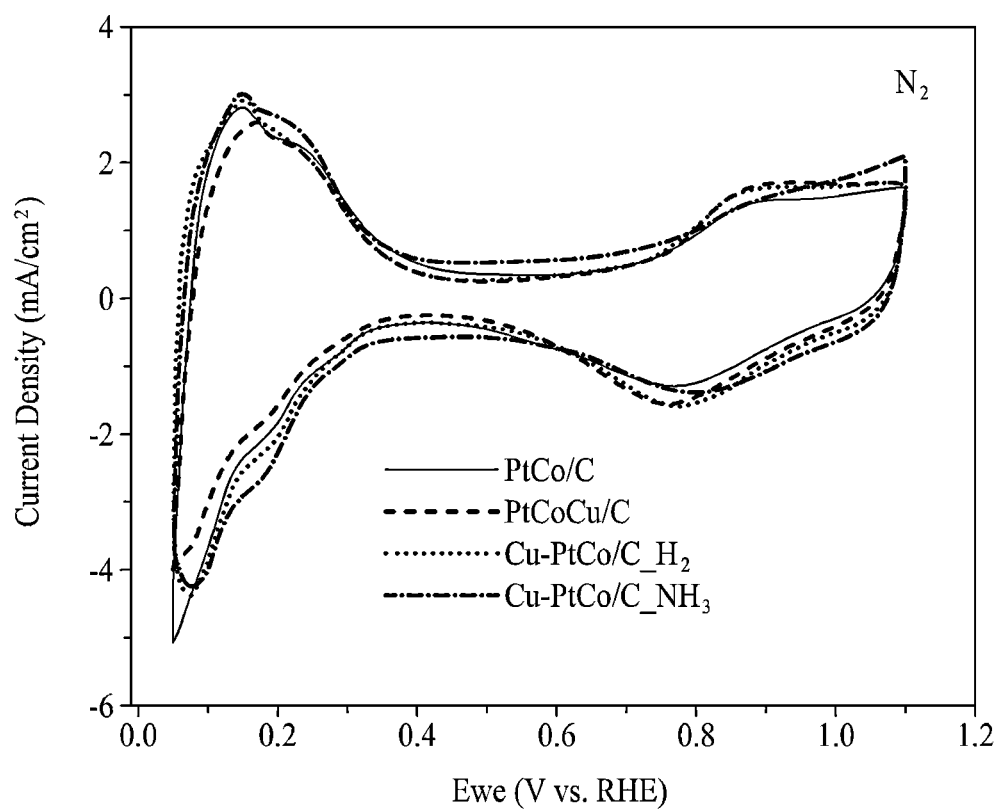
Figure 8:
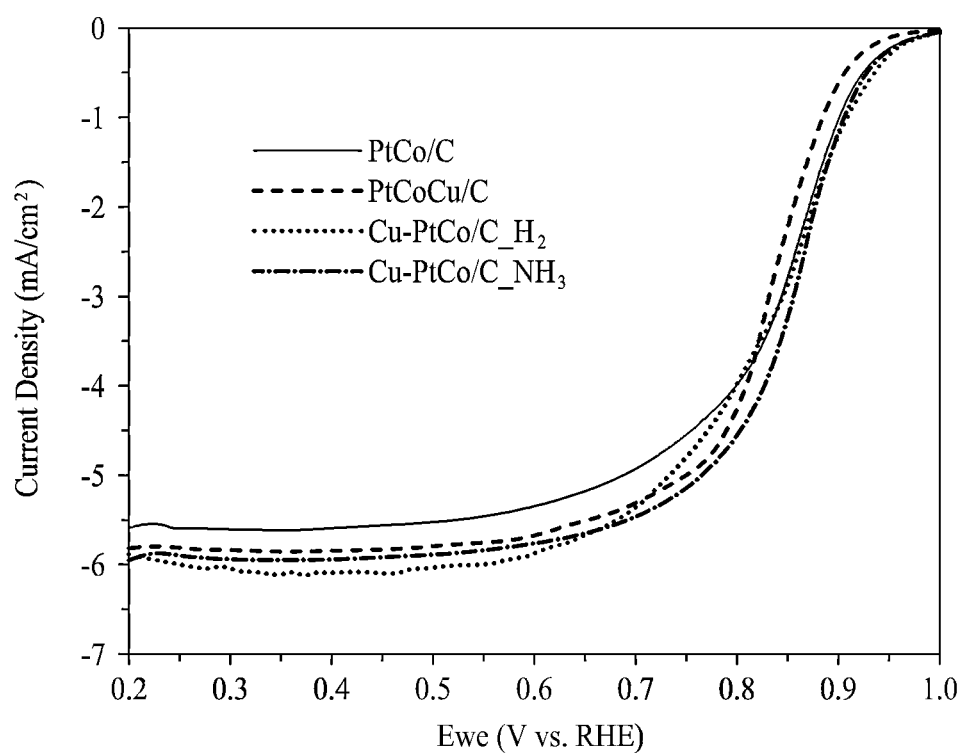
Figure 9:
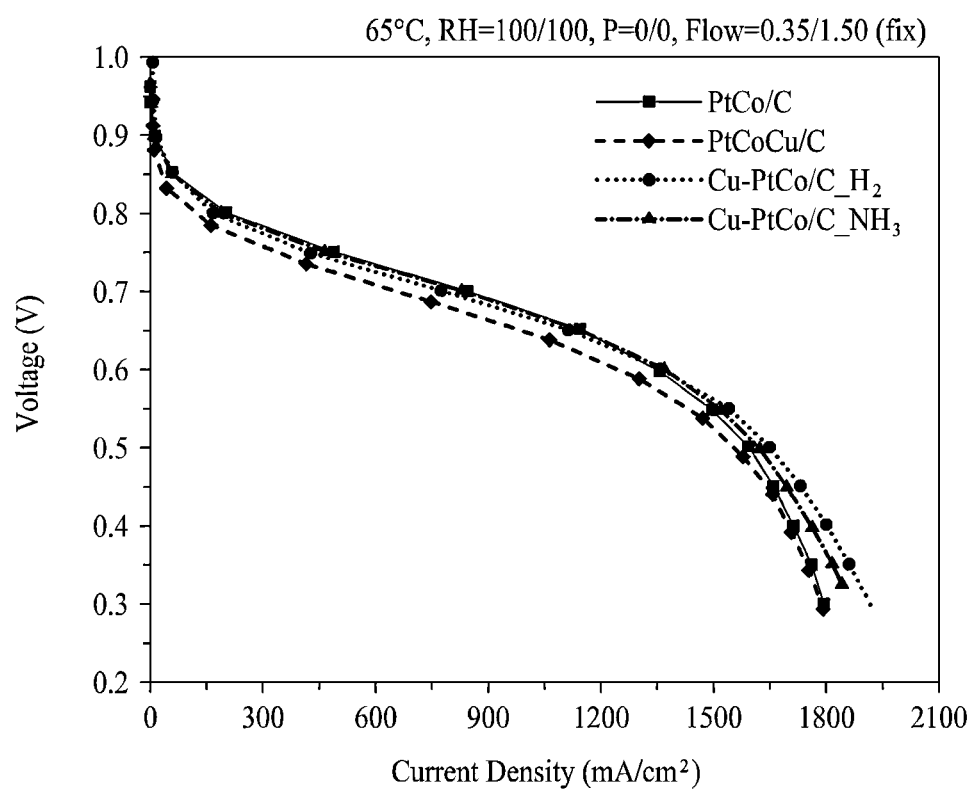
Figure 10:
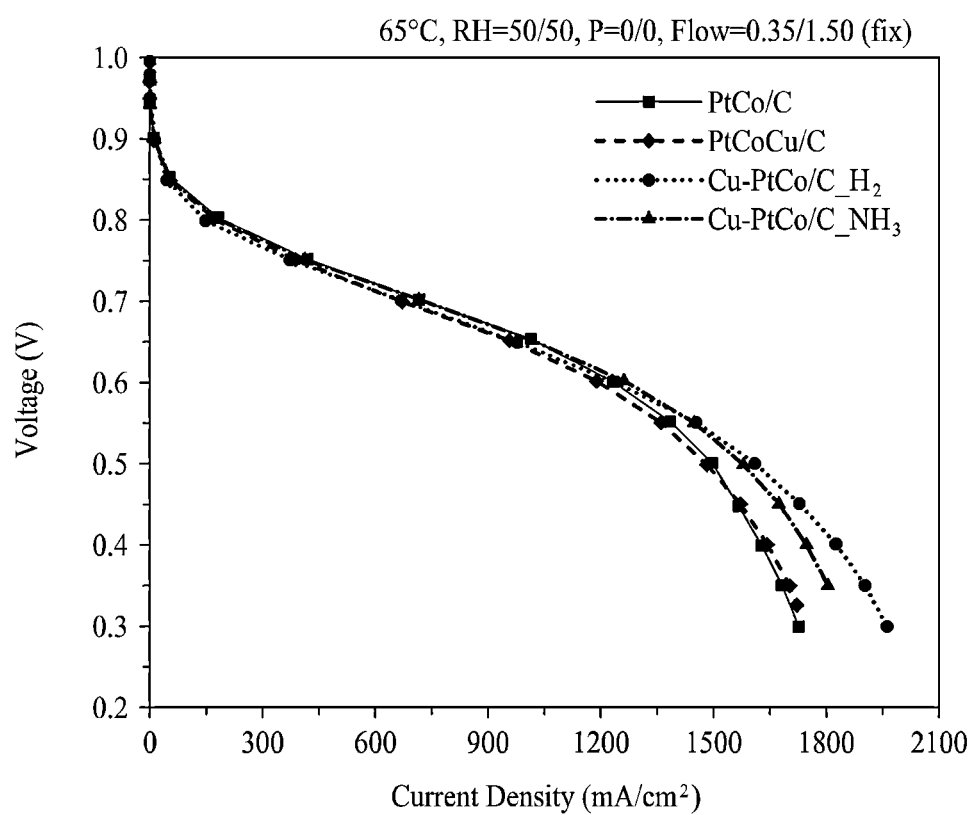

(a) and (b) of FIG. 2 are transmission electron microscopy (TEM) and high-resolution-transmission electron microscopy (HR-TEM) images of the catalyst of Example 1;

(a) and (b) of FIG. 3 are transmission electron microscopy (TEM) and high resolution-transmission electron microscopy (HR-TEM) images showing the catalyst of Example 2;

FIG. 4 is a transmission electron microscopy (TEM) image showing the catalyst of Comparative Example 1;

FIG. 5 is a transmission electron microscopy (TEM) image showing the catalyst of Comparative Example 2;

FIG. 6 is a graph showing the results of XRD analysis of catalysts of Examples and Comparative Examples;

FIG. 7 is a graph showing the results of a cyclic voltammetry (CV) test for electrodes each formed using catalysts of Examples and Comparative Examples;

FIG. 8 is a graph showing the results of LSV (linear sweep voltammetry) tests for electrodes each formed from catalysts of Examples and Comparative Examples;

FIG. 9 is a graph showing the performance of membrane-electrode assemblies each manufactured using the catalysts of Examples and Comparative Examples under high-humidity operating conditions (100% RH/100% RH); and FIG. 10 is a graph showing the performance of membrane-electrode assemblies each manufactured using the catalysts of Examples and Comparative Examples under low-humidity operating conditions (50% RH/50% RH).

BEST MODE

Hereinafter, the present disclosure will be described in more detail with reference to specific examples. However, the following examples are provided only for better understanding of the present disclosure, and should not be construed as limiting the scope of the present disclosure.

Figure 1:
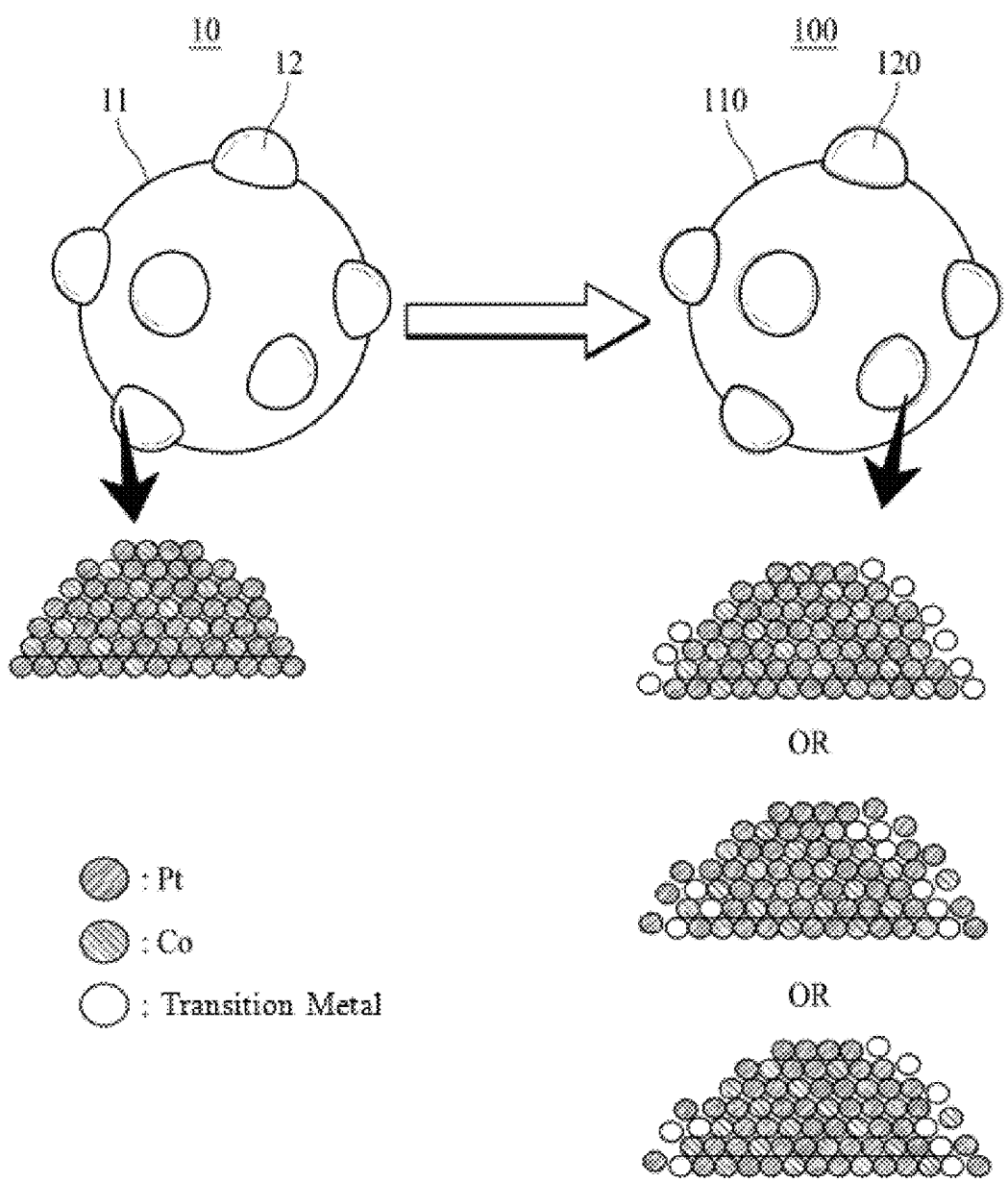
FIG. 1 schematically shows a catalyst of the present disclosure prepared by doping or partially alloying a PtCo catalyst with a transition metal.

FIG. 1 schematically shows a catalyst 100 of the present disclosure, produced by doping and/or partially alloying a conventional PtCo catalyst (hereinafter referred to as a "first catalyst") 10 with a transition metal.

As illustrated in FIG. 1, the first catalyst 10 is a commercially available catalyst or a catalyst prepared in advance, which includes a support 11 and a PtCo alloy particle 12 supported on the support 11.

The support 11 may be (i) a carbon-based support, (ii) a porous inorganic oxide support such as zirconia, alumina, titania, silica, and ceria, or (iii) a zeolite support.

When the support 11 is a carbon-based support, the first catalyst 10 may be represented as a PtCo/C catalyst. The carbon-based support may be graphite, super P, carbon fiber, carbon sheet, carbon black, Ketjen black, Denka black, acetylene black, carbon nanotubes (CNT), carbon spheres, carbon ribbon, fullerene, active carbon, carbon nanowires, carbon nanoballs, carbon nanohorns, carbon nanocages, carbon nanorings, ordered nano-/meso-porous carbon, carbon aerogel, mesoporous carbon, graphene, stabilized carbon, or a combination of two or more thereof.

As illustrated in FIG. 1, the PtCo alloy particle 12 is a particle formed of a binary alloy of Pt and Co, and thus Pt and Co are homogeneously distributed in the particle. According to an embodiment of the present disclosure, the molar ratio of Co to Pt in the PtCo alloy particle 12 may be 0.05 to 0.4.

According to the present disclosure, the first catalyst 10 is doped and/or partially alloyed with at least one transition metal selected from the group consisting of V, Cr, Mn, Fe, Ni, Cu, W, and Mo.

The doping and/or partially alloying process includes mixing the precursor of the transition metal with the first catalyst 10 to obtain a mixture and heat-treating the mixture.

For example, the transition metal may be Cu, and the precursor of the transition metal may be $CuCl_2$, $CuSO_4$, $CuO$, $Cu(CO_2CH_3)_2$, $CuS$, $Cu(NO_3)_2$, $Cu(ClO_4)_2$, $CuCO_3$, or a mixture of two or more thereof.

The mixture may be obtained by (i) a first method of dispersing the first catalyst in a solution or dispersion containing the precursor, (ii) a second method of mixing a solution or dispersion containing the precursor with a dispersion containing the first catalyst, or (iii) a third method of directly mixing the precursor in a solid phase with the first catalyst in a solid phase.

However, the liquid mixture obtained by the first or second method may be more homogeneous than the solid mixture obtained by the third method, and thus is more advantageous in doping and/or partially alloying the first catalyst uniformly.

When the mixture is obtained by the first or second method, the method may further include drying the mixture before the heat treatment.

The heat treatment of the mixture may be performed in an atmosphere of a reductive gas or in an atmosphere of a mixed gas containing an inactive gas and the reductive gas at 100 to 300° C. for 10 to 60 minutes. For example, the heat treatment of the mixture may be performed in a tube furnace.

When the heat treatment of the mixture is performed in the atmosphere of the reductive gas, the reductive gas may be $NH_3$ gas.

When the heat treatment of the mixture is performed in the atmosphere of the mixed gas containing the inactive gas and the reductive gas, the inactive gas may be $N_2$ or Ar gas, and the reductive gas may be $H_2$ gas, $NH_3$ gas, or a combination thereof. The mixed gas may contain 5 to 15 vol % of the reductive gas and 85 to 95 vol % of the inactive gas.

The heat treatment performed in the mixed gas atmosphere may be carried out by introducing the mixture into an electric furnace, elevating the temperature under an inactive gas (for example, $N_2$ or Ar gas), and supplying a reductive gas (for example, $NH_3$ gas) to the electric furnace when the temperature of the electric furnace reaches a target temperature.

The catalyst 100 of the present disclosure can be obtained by completing the doping and/or partial alloying of the PtCo catalyst 10 with the transition metal through the heat treatment of the mixture.

As illustrated in FIG. 1, the catalyst 100 for a fuel cell of the present disclosure includes a support 110 and PtCo alloy particle 120 supported on the support 110, wherein the PtCo alloy particle 120 is doped and/or partially alloyed with at least one transition metal selected from the group consisting of V, Cr, Mn, Fe, Ni, Cu, W, and Mo.

The support 110 is the same as the support 11 of the first catalyst 10 used for the preparation of the catalyst 100. The support 110 may be (i) a carbon-based support, (ii) a porous inorganic oxide support such as zirconia, alumina, titania, silica, and ceria, or (iii) a zeolite support. The carbon-based support may be graphite, super P, carbon fiber, carbon sheet, carbon black, Ketjen black, Denka black, acetylene black, carbon nanotubes (CNT), carbon spheres, carbon ribbon, fullerene, active carbon, carbon nanowires, carbon nanoballs, carbon nanohorns, carbon nanocages, carbon nanorings, ordered nano-/meso-porous carbon, carbon aerogel, mesoporous carbon, graphene, stabilized carbon, or a combination of two or more thereof.

As illustrated in FIG. 1, the PtCo alloy particle 120 may include (i) a transition metal-doped or transition metal-partially alloyed surface modified with the transition metal, (ii) a transition metal-doped or transition metal-partially alloyed internal region containing the transition metal, or (iii) both the transition metal-doped or transition metal-partially alloyed surface and the transition metal-doped or transition metal-partially alloyed internal region.

Since the PtCo alloy particle 120 of the present disclosure is basically a binary alloy of Pt and Co, the PtCo alloy particle 120 further includes a transition metal-free surface and/or a transition metal-free internal region, where no transition metal exists. The transition metal-doped or transition metal-partially alloyed surface and the transition metal-doped or transition metal-partially alloyed internal region include a mixture of Pt, Co, and Cu, whereas the transition metal-free surface and the transition metal-free internal region include Pt and Co, but do not include Cu.

The PtCo alloy particle 120 of the present disclosure is different from a particle of ternary alloy in that it is basically a particle of binary alloy of Pt and Co which is only partially doped and/or partially alloyed with the transition metal (i.e., a particle including the transition metal-free surface and/or the transition metal-free internal region) while the particle of ternary alloy is a particle obtained by alloying the transition metal with Pt and Co (i.e., a particle throughout which the transition metal is uniformly distributed together with Pt and Co).

As illustrated in FIG. 1, the PtCo alloy particle 120 may have (i) a first structure including a transition metal-doped or transition metal-partially alloyed surface, and the transition metal-free internal region (corresponding to the entire internal region of the particles), (ii) a second structure including the transition metal-free surface, the transition metal-doped or transition metal-partially alloyed internal region and the transition metal-free internal region, or (iii) a third structure including the transition metal-doped or transition metal-partially alloyed surface, the transition metal-doped or transition metal-partially alloyed internal region, and the transition metal-free internal region. Each of the first and third structures may further include the transition metal-free surface.

When the PtCo alloy particle 120 has a second or third structure, the transition metal-free internal region may be farther away from an exposed surface of the PtCo alloy particle than the transition metal-doped or transition metal-partially alloyed internal region.

According to an embodiment of the present disclosure, a molar ratio of Co to Pt in the PtCo alloy particle 120 may be 0.05 to 0.4, and a molar ratio of the transition metal to Pt may be 0.03 to 0.15.

The catalyst 100 for a fuel cell of the present disclosure, prepared by doping and/or partially alloying the PtCo alloy particles 12 of the PtCo catalyst 10 with a transition metal (Me), is represented as a Me-PtCo catalyst, which is distinguished from the PtCoMe catalyst, which is a ternary alloy of Pt, Co and a transition metal (Me).

For example, the catalyst 100 of the present disclosure may be a Cu—PtCo catalyst containing a PtCo alloy particle 120 doped and/or partially alloyed with Cu, which is distinguished from the PtCoCu catalyst containing a particle formed of a ternary alloy of Pt, Co and Cu.

In addition, when the support 110 is a carbon-based support and the transition metal which is doped and/or partially alloyed in the PtCo alloy particle 120 is Cu, the catalyst 100 of the present disclosure is represented as a Cu—PtCo/C catalyst, which is distinguished from a PtCoCu/C catalyst in which a ternary alloy of Pt, Co, and Cu is dispersed in the form of particles on a carbon-based support.

The catalyst 100 of the present disclosure is dispersed in a dispersion medium along with an ionomer to obtain an electrode slurry, and an anode and a cathode are formed, respectively, on two surfaces of a polymer electrolyte membrane (PEM) using the electrode slurry through decal transfer or direct coating to manufacture the membrane-electrode assembly (MEA) of the present disclosure.

Alternatively, the membrane-electrode assembly (MEA) of the present disclosure includes an anode, a cathode, and a polymer electrolyte membrane (PEM) disposed therebetween, wherein one of the anode and cathode includes the catalyst 100 of the present disclosure and the other thereof includes a conventional platinum or platinum-based alloy catalyst (e.g., a Pt/C catalyst, PtCo/C catalyst, PtCoCu/C catalyst, PtCoNi/C catalyst, etc.), instead of the catalyst 100 of the present disclosure.

The ionomer dispersed in the dispersion medium along with the catalyst 100 serves to transfer cations, and also serves as a binder for improving adhesion between the catalyst 100 and the polymer electrolyte membrane (PEM).

The ionomer may have at least one ion-conducting group selected from the group consisting of a sulfonic acid group, a carboxyl group, a boronic acid group, a phosphoric acid group, an imide group, a sulfonimide group, a sulfonamide group, and a sulfonic fluoride group.

For example, the ionomer may be a fluorine-based ionomer such as poly(perfluorosulfonic acid) or poly(perfluorocarboxylic acid).

Alternatively, the ionomer may be a hydrocarbon-based polymer such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, or sulfonated polyarylene ether sulfone ketone.

The dispersion medium of the electrode slurry in which the catalyst 100 and the electrode slurry are dispersed may be water, a hydrophilic solvent, an organic solvent, or a mixture of two or more thereof.

The hydrophilic solvent may be a compound containing, as a main chain, a linear or branched saturated or unsaturated hydrocarbon having 1 to 12 carbon atoms, and having at least one functional group selected from the group consisting of alcohols, isopropyl alcohol, ketones, aldehydes, carbonates, carboxylates, carboxylic acids, ethers and amides.

The organic solvent may be N-methylpyrrolidone (NMP), dimethylsulfoxide (DMSO), tetrahydrofuran (THF), dimethylacetamide (DMAc), or a mixture of two or more thereof, but is not limited thereto.

MODE FOR DISCLOSURE

Hereinafter, the present disclosure will be described in more detail with reference to specific examples. These examples are provided only for better understanding and should not be construed as limiting the scope of the present disclosure.

Example 1

1 g of a PtCo/C catalyst (i.e., first catalyst) was dispersed in water to obtain a dispersion. In addition, 1.3 g of $CuCl_2$ was dissolved in water to obtain a Cu precursor solution. The dispersion was mixed to homogeneity with the Cu precursor solution to obtain a mixed solution, and the mixed solution was dried to remove water to obtain a solid as a mixture of the PtCo/C catalyst and the Cu precursor. The solid was introduced into a tube furnace and heat-treated at 250° C. in a mixed gas atmosphere of $H_2$ and $N_2$ for 30 minutes to obtain a Cu—PtCo/C catalyst (hereinafter, referred to as a Cu—PtCo/C_$H_2$ catalyst).

Example 2

A Cu—PtCo/C catalyst was obtained in the same manner as in Example 1, except that the heat treatment was performed in an $NH_3$ gas atmosphere (hereinafter, the catalyst is referred to as Cu—PtCo/C_$NH_3$ catalyst).

Comparative Example 1

The same type of PtCo/C catalyst as the PtCo/C catalyst used as the first catalyst in Example 1 was prepared.

Comparative Example 2

The support was dispersed in water to obtain a dispersion. Subsequently, a Pt precursor ($H_2PtCl_6$), a Co precursor ($CoCl_2$), and a Cu precursor ($CuCl_2$) were mixed with the dispersion, and then a reduction reaction was performed by a polyol reduction method to obtain a PtCoCu/C catalyst as a ternary alloy catalyst.

[Transmission Electron Microscopy (TEM) Analysis of Catalyst]

(a) and (b) of FIG. 2 are transmission electron microscopy (TEM) and high-resolution-transmission electron microscopy (HR-TEM) images showing the Cu—PtCo/C_$H_2$ catalyst of Example 1, (a) and (b) of FIG. 3 are TEM and HR-TEM images showing the Cu—PtCo/C_$NH_3$ catalyst of Example 2, FIG. 4 is a TEM image showing the PtCo/C catalyst of Comparative Example 1, and FIG. 5 is a TEM image showing the PtCoCu/C catalyst of Comparative Example 2.

As can be seen from FIGS. 2 to 5, the catalysts of Examples have no significant difference from the catalysts of Comparative Examples in terms of particle distribution and state, except that the particle size is slightly increased.

As can be seen from the HR-TEM image of the Cu—PtCo/C_$H_2$ catalyst [FIG. 2(*b*)] and the HR-TEM image of the Cu—PtCo/C_$NH_3$ catalyst [FIG. 3(*b*)], the Cu—PtCo/C_$H_2$ catalyst of Example 1 did not have any significant difference from the Cu—PtCo/C $NH_3$ catalyst of Example 2 except that the particle size was slightly larger than that of the Cu—PtCo/C_$NH_3$ catalyst of Example 2. That is, it can be seen that there is no large difference according to the type of reductive gas supplied during heat treatment.

[XRD Analysis of Catalyst]

FIG. 6 is a graph showing the results of XRD analysis of catalysts of Examples and Comparative Examples. Similar to the results of TEM analysis, it can be seen from FIG. 6 that the catalysts of Examples have no significant difference from the catalysts of Comparative examples except that the particle size is slightly increased.

[CV Test, LSV Test, and Voltage Cycling Test]

A catalyst was dispersed in a mixture of isopropyl alcohol and water at a volume ratio of 7:3 through ultrasonic dispersion to prepare an electrode slurry. The electrode slurry was cast on a rotating disk electrode (RDE) and dried to produce an electrode. A cyclic voltammetry (CV) test (temperature: room temperature, electrolyte solution: 0.1M $HClO_4$ aqueous solution saturated with $N_2$) was performed on the electrode using an electrochemical measuring device to measure the electro-chemical surface area (ECSA) of the catalyst.

FIG. 7 is a graph showing the results of a cyclic voltammetry (CV) test for the electrodes each produced from the catalysts of Examples and Comparative Examples. The catalysts of Examples, particularly the Cu—PtCo/C_$H_2$ catalyst of Example 1, exhibited an increased electro-chemical surface area (ECSA).

Subsequently, the electrolyte solution was saturated with $O_2$, and then a LSV (linear sweep voltammetry) test was performed to evaluate the oxidation reduction reaction (ORR) activity of the catalyst.

FIG. 8 is a graph showing the results of a linear sweep voltammetry (LSV) test for the electrodes each produced from the catalysts of Examples and Comparative Examples. The catalysts of Examples, particularly the Cu—PtCo/C_$H_2$ catalyst of Example 1, exhibited better ORR activity.

In addition, in order to evaluate the electrochemical durability of the catalyst, a voltage cycling test (30,000 cycles) was performed at 0.6 to 1.0V on the electrolyte solution saturated with $O_2$. The electro-chemical surface area (ECSA) was measured before and after the voltage cycling test and the ECSA loss was calculated based on the measured values, and the results are shown in Table 1 below.

TABLE 1

|  | Example 1 | Example 2 | Comparative Example 1 | Comparative Example 2 |
|---|---|---|---|---|
| Catalyst | Cu—PtCo/C_$H_2$ | Cu—PtCo/C_$NH_3$ | PtCo/C | PtCoCu/C |
| ECSA loss | 28% | 30% | 36% | 35% |

As can be seen from Table 1 above, the catalysts of Examples, particularly the Cu—PtCo/C_$H_2$ catalyst of Example 1, exhibited a notably lower ECSA loss than the catalysts of Comparative Examples, which means that the Cu—PtCo/C catalyst of the present disclosure, prepared by doping and/or partially alloying PtCo alloy particles with Cu, has higher durability than the PtCo/C catalyst of Comparative Example 1 as well as the PtCoCu/C catalyst of Comparative Example 2.

[MEA Performance Test]

A catalyst was dispersed in a mixture of isopropyl alcohol and water at a volume ratio of 7:3 through ultrasonic dispersion to prepare an electrode slurry. The electrode slurry was applied in an area of 25 $cm^2$ to each of the first and second release films and dried in an oven at 90° C. for 8 hours to form a square anode and cathode, respectively. Subsequently, the first release film, the polymer electrolyte membrane, and the second release film were laminated and thermally compressed such that the anode and the cathode respectively contacted the first and second surfaces of a polymer-electrolyte membrane produced using perfluorosulfonic acid. Then, the first and second release films were removed to complete a membrane-electrode assembly. The membrane-electrode assembly was connected to a fuel cell unit cell test device and, after activation, the output performance was measured at 65° C. and normal pressure under high-humidity operating conditions (100% RH/100% RH) and low-humidity operating conditions (50% RH/50% RH).

FIGS. 9 and 10 are graphs showing the performance of membrane-electrode assemblies each manufactured using the catalysts of Examples and Comparative Examples under high-humidity and low-humidity operating conditions. The graphs of FIGS. 9 and 10 show that the membrane-electrode assemblies manufactured with the Cu—PtCo/C catalysts of Examples exhibit improved performance under both high-humidity operating conditions and low-humidity operating conditions compared to membrane-electrode assemblies manufactured with PtCo/C and PtCoCu/C catalysts of Comparative Examples.

The invention claimed is:

1. A catalyst for a fuel cell comprising:
    a support; and
    a PtCo alloy particle supported on the support,
    wherein the PtCo alloy particle comprises (i) a transition metal-doped or transition metal-partially alloyed internal region including at least one transition metal selected from the group consisting of V, Cr, Mn, Fe, Ni, Cu, W, and Mo and (ii) a transition metal-free internal region where the transition metal does not exist, and
    wherein the transition metal-free internal region is farther away from an exposed surface of the PtCo alloy particle than the transition metal-doped or transition metal-partially alloyed internal region.

2. The catalyst according to claim 1, wherein the PtCo alloy particle further comprises a transition metal-doped or transition metal-partially alloyed surface modified with the transition metal.

3. The catalyst according to claim 1, wherein an entire surface of the PtCo alloy particle is a transition metal-free surface where the transition metal does not exist.

4. The catalyst according to claim 1, wherein the transition metal is Cu.

5. A membrane-electrode assembly comprising:
    an anode;
    a cathode; and
    a polymer electrolyte membrane interposed between the anode and the cathode,
    wherein at least one of the anode and cathode comprises the catalyst according to claim 1.

6. A catalyst for a fuel cell comprising:
    a support; and
    a PtCo alloy particle supported on the support,
    wherein the PtCo alloy particle comprises a transition metal-doped or transition metal-partially alloyed surface modified with at least one transition metal selected from the group consisting of V, Cr, Mn, Fe, Ni, Cu, W, and Mo, or a transition metal-doped or transition metal-partially alloyed internal region including the transition metal,
    wherein, in the PtCo alloy particle, a molar ratio of Co to Pt is 0.05 to 0.4, and a molar ratio of the transition metal to Pt is 0.03 to 0.15.

7. A method for preparing a catalyst for a fuel cell, the method comprising:
    preparing a first catalyst comprising a support and a PtCo alloy particle supported on the support;
    mixing the first catalyst with a precursor of at least one transition metal selected from the group consisting of V, Cr, Mn, Fe, Ni, Cu, W, and Mo to obtain a mixture; and
    heat-treating the mixture.

8. The method according to claim 7, wherein a molar ratio of Co to Pt in the PtCo alloy particle of the first catalyst is 0.05 to 0.4.

9. The method according to claim 7, wherein the transition metal is Cu, and
    the precursor is $CuCl_2$, CuSO4, CuO, $Cu(CO_2CH_3)_2$, CuS, Cu $(NO_3)_2$, $Cu(ClO_4)_2$, $CuCO_3$, or a mixture of two or more thereof.

10. The method according to claim 7, wherein the mixture is obtained by (i) dispersing the first catalyst in a solution or dispersion containing the precursor, (ii) mixing the solution or dispersion containing the precursor with a dispersion containing the first catalyst, or (iii) directly mixing the precursor in a solid phase with the first catalyst in a solid phase.

11. The method according to claim 7, wherein the mixture is obtained by (i) dispersing the first catalyst in a solution or dispersion containing the precursor, or (ii) mixing the solution or dispersion containing the precursor with a dispersion containing the first catalyst, and
the method further comprises drying the mixture before the heat-treating.

12. The method according to claim 7, wherein the heat-treating is performed at 100 to 300° C. in an atmosphere of a reductive gas or in an atmosphere of a mixed gas including the reductive gas and an inactive gas for 10 to 60 minutes.

13. The method according to claim 12, wherein the heat-treating is performed in an atmosphere of the reductive gas, and
the reductive gas is $NH_3$ gas.

14. The method according to claim 12, wherein the heat-treating is performed in the atmosphere of the mixed gas, and
the mixed gas comprises 5 to 15 vol % of the reductive gas.

15. The method according to claim 12, wherein the heat-treating is performed in the atmosphere of the mixed gas, and
the mixed gas comprises $H_2$ gas as the reductive gas and $N_2$ or Ar gas as the inactive gas.

16. The method according to claim 12, wherein the heat-treating is performed in the atmosphere of the mixed gas, and
the mixed gas comprises $NH_3$ gas as the reductive gas and $N_2$ or Ar gas as the inactive gas.

\* \* \* \* \*